COLOR TELEVISION CAMERA WITH SINGLE SCANNING BEAM

Filed April 25, 1966 6 Sheets-Sheet 1

INVENTOR.
Marvin Camras

BY Hill, Sherman, Meroni, Gross & Simpson ATTORNEYS

Dec. 16, 1969 M. CAMRAS 3,484,546

COLOR TELEVISION CAMERA WITH SINGLE SCANNING BEAM

Filed April 25, 1966 6 Sheets-Sheet 2

INVENTOR.

Marvin Camras

BY Hill, Sherman, Meroni, Gross & Simpson ATTORNEYS

COLOR TELEVISION CAMERA WITH SINGLE SCANNING BEAM

INVENTOR.
Marvin Camras

BY Hill, Sherman, Meroni, Gross & Simpson
ATTORNEYS

COLOR TELEVISION CAMERA WITH SINGLE SCANNING BEAM

Filed April 25, 1966 6 Sheets-Sheet 4

INVENTOR.
Marvin Camras

BY Hill, Sherman, Meroni, Gross & Simpson ATTORNEYS

COLOR TELEVISION CAMERA WITH SINGLE SCANNING BEAM

Filed April 25, 1966 6 Sheets-Sheet 5

INVENTOR.
Marvin Camras

BY Hill, Sherman, Meroni, Gross & Simpson ATTORNEYS

COLOR TELEVISION CAMERA WITH SINGLE SCANNING BEAM

INVENTOR.
Marvin Camras

BY Hill, Sherman, Meroni, Gross & Simpson ATTORNEYS

United States Patent Office 3,484,546

Patented Dec. 16, 1969

3,484,546
COLOR TELEVISION CAMERA WITH SINGLE SCANNING BEAM

Marvin Camras, Glencoe, Ill., assignor to IIT Research Institute, Chicago, Ill., a corporation of Illinois Filed Apr. 25, 1966, Ser. No. 545,050
Int. Cl. H04n 5/38, 5/44
U.S. Cl. 178—5.4 5 Claims

ABSTRACT OF THE DISCLOSURE

A color television camera utilizing a tricolor filter transmitting different color segments of an image for sequential scanning by a single electron beam, and transmission, recording and playback circuitry for color television and related audio frequency signals with frequency mixing techniques for reducing the band width of the video and/or audio signals to facilitate recording thereof.

CROSS REFERENCES TO RELATED APPLICATIONS

Reference is hereby made pursuant to the requirements of 35 U.S.C. 120 to my copending applications Ser. No. 393,282 filed Aug. 31, 1964 and Ser. No. 528,934 filed Feb. 21, 1966.

This invention relates to a color television system and method and particularly to novel components therefor including a greatly simplified color camera for generating video color signals, a portable camera system, novel video transducing circuitry and novel audio circuitry for transducing audio signals associated with a video event.

It is a general objective of the present invention to provide a low cost color television camera which may be utilized in conjunction with a home video tape recording system to take amateur motion pictures in color.

It is another general objective to provide a color video tape recording system for making recordings in color, with sound, and suitable for widespread use such as now exists for photographic film motion picture equipment.

It is also an object of the present invention to provide a video color camera making use of a single image tube which may be of conventional construction.

It is another object of the invention to provide such a color camera which may utilize standard monochrome camera circuits for focusing, deflection and so forth.

Another object of the invention is to provide a video color camera system wherein the camera is readily portable.

Still another object of the invention is to provide a video color transducer system wherein the video color signals may be recorded on a succession of adjacent channels with relative freedom of cross talk between channels.

Still another and further object of the invention is to provide a video color transducer system wherein a recorded carrier signal is relatively immune to dropout and noise.

A still further object is to provide a transducer system which is relatively insensitive to record speed variations.

Another object of the invention resides in the provision of a transducer system wherein a video signal including a carrier frequency may be recorded but which enables use of a relatively restricted upper limit of frequency response for the transducer system.

Still another and further object of the invention resides in the provision of a relatively inexpensive and simple system for recording audio signals associated with a color video signal.

A further object of the invention resides in the provision of an improved color television camera tube and system utilizing monochrome circuits for focus, deflection and the like.

A related object is to provide such a camera which accommodates a simplified optical system.

Other objects, features and advantages of the present invention will be apparent from the following detailed description taken in connection with the accompanying drawings, in which.

Figures 1, 2, 3:
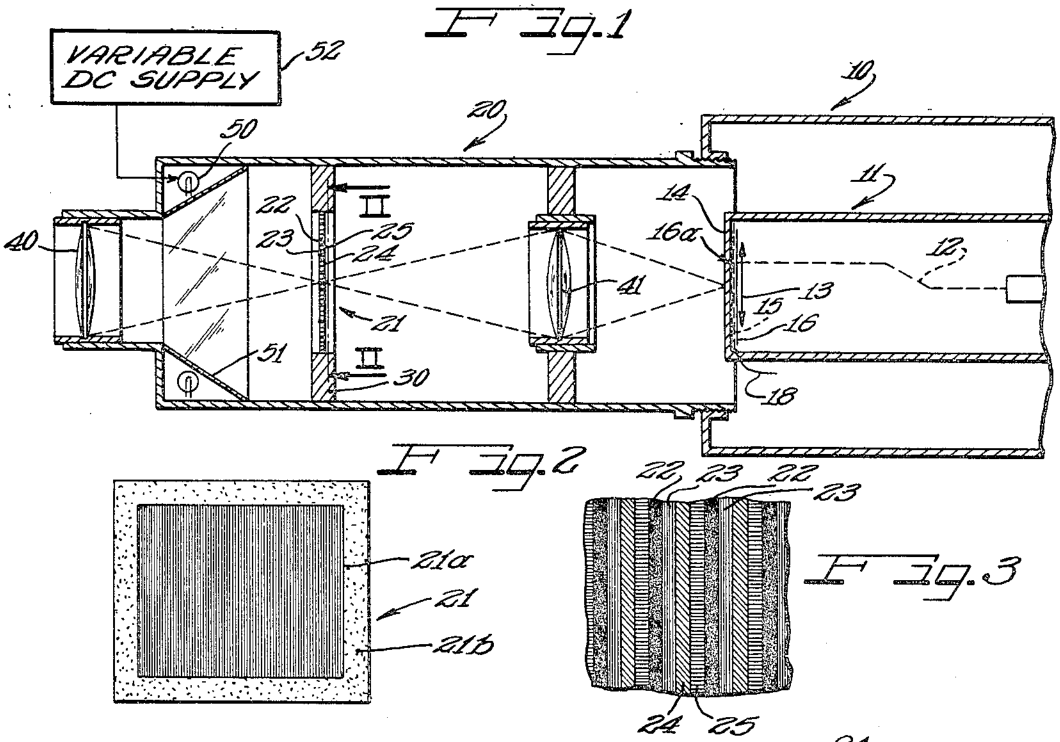
FIG. 1 is a diagrammatic longitudinal sectional view of a color television camera arrangement in accordance with the present invention.
FIG. 2 is a diagrammatic cross-section view taken generally along the line II—II of FIG. 1.
FIG. 3 is a partial enlarged elevational view showing a portion of the color mask of FIGS. 1 and 2 in greater detail.

Referring to FIG. 1, a color video camera 10 may comprise a conventional image tube 11 preferably a high resolution type of Vidicon, Plumbicon, or other monochrome image tube. The electronics for focusing the beam 12, and for causing the beam to scan horizontally and vertically, and so forth are not detailed since they may be the same as in a conventional monochrome camera conforming to U.S.A. or other television standards. In one embodiment in accordance with the present invention FIG. 1 represents a horizontal sectional view with the beam 12 scanning in the horizontal direction as indicated by double-headed arrow 13 at a rate of approximately 15,750 lines per second and scanning vertically so as to generate approximately 60 interlaced fields of 30 complete frames per second.

By way of diagrammatic illustration, the reference numeral 14 may designate a transparent end wall of the camera tube 11, the reference numeral 15 may designate a transparent electrically conductive layer at the interior face of the end wall 14, and the reference numeral 16 may designate a conventional photoconductive layer deposited on the transparent conductive layer 15. For purposes of diagrammatic illustration, an output lead has been indicated at 18 connected to the conductive layer 15 for supplying an output signal from the tube 11.

For enabling the tube 11 to generate color video signals in accordance with a scene to be televised (the scene being located to the left as viewed in FIG. 1), the camera 10 is provided with an optical system 20 including a color mask 21. The mask 21 is constructed so as to create light intensities impinging at different regions or segments of the tube face 14 in accordance with the intensity of different color components of the scene being viewed. By way of specific illustration, the color mask 21 is shown as made up of a series of vertical stripes with a first stripe being opaque, the next transmitting red light, for example, the next transmitting green light, for example, and the next transmitting blue light, for example. For the purpose of a diagrammatic illustration, opaque stripes are located as indicated at 22, red stripes as indicated at 23, green stripes as indicated at 24, and blue stripes as indicated at 25. By way of example, the opaque vertical stripes and the stripes of the successive colors may alternate in a regular sequence across the width of the mask 21 as best seen in FIG. 3. By way of example, the mask may have of the order of 100 to 300 sets of the vertical stripes 22–25, that is from 100 to 300 opaque stripes 22, from 100 to 300 red stripes, from 100 to 300 green stripes and from 100 to 300 blue stripes.

If the horizontal scan time exclusive of the retrace intervals is about 53 microseconds, with 300 sets of stripes, each set of stripes containing an opaque stripe and stripes of the three colors will be scanned during a time interval of about 0.18 microsecond. The information concerning each color sample then might occupy a time interval of about .045 microsecond.

By way of a specific example, the color mask may have the configuration illustrated in FIG. 2 with an active area **21*a* of about 1 inch by 1.33 inch and an opaque border as indicated at 21*b* which may be carried in an adjustable frame such as diagrammatically indicated at 30 in FIG. 1. The mask 21 may be made on 35 millimeter color film. For stability a glass base or polyester base such as Du Pont "Cronar" is recommended. The mask 21** may be economically made by successively photographing a bar pattern having vertical opaque bars with transparent spaces between the bars having, for example, one-third the width of the opaque bars. In a first exposure of the film, a red light may be utilized so that the film is exposed to a series of spaced red lines occupying one-fourth the film area. Thereafter, the bar pattern would be shifted by a distance equal to one-fourth of the pitch of the bars, this distance being equal to the width of the transparent spaces of the pattern. Then the film would be exposed, for example using a green light source so as to photograph stripes of green light adjacent the red stripes. The bar pattern would then be shifted a further distance equal to one-fourth the pitch and subjected to a blue light so as to produce the desired blue stripes on the film when developed. While the bar pattern might have 100 to 300 bars in accordance with the example previously given, a lesser number may be used depending on the resolution capability and requirements of the system, the choice of color mask size and so fourth. The bar pattern used in producing the mask may be substantially larger than the size mask to be produced with an appropriate lens system being used to image the bar pattern to a reduced size on the film.

The bar pattern need not be uniform but may be distorted to compensate for non-linearities in the scanning pattern of the image tube, such that the output of the image tube will have a more uniform frequency, for example. Other photographic processes are advantageous for producing the color mass. For example a glass plate may be coated with bichromated gelatin, photographically exposed to the ¼ pitch bar pattern, washed in warm water to remove the ¾ unexposed gelatin, and the remainder dyed with a "primary" color. The plate is then recoated, the bar pattern moved ¼ pitch, and the process repeated to give an adjacent pattern in another primary color; repeating until the mask is complete.

The polyester or glass backing for the film provides dimensional stability, fast (non-fading) colors preferably being used for the mask dyes. The mask mount 30 is adjustable relative to the image tube 11 so that the different colored stripes or segments of the light image are properly registered with the scanning path of the beam 12.

The optical system 20 illustrated in FIG. 1 further comprises a main objective lens 40 with variable focus and aperture so as to bring the image being viewed to a focus on the color mask 21. An example of such a lens would be a 75 millimeter focal length *f*/2 lens that "covers" the mask size. This type of lens is used on 35 millimeter cameras. Another example would be a 50 millimeter focal length *f*/1.4 lens, also provided with iris stop diaphragm and focusing such as to image the scene to be televised onto the face of the color mask 21.

A second lens is indicated at 41 and may conveniently be of the type used in 16 millimeter cameras, for example an *f*/1.4 lens of 25 millimeter focal length, set to focus the image of the mask 21 onto a photosensitive region generally indicated at **16*a* about ⅜" by ½" in size. This may constitute, for example, a 3 to 1 reduction in image size in comparison to the size of the image focused on mask 21**.

Figure 4:
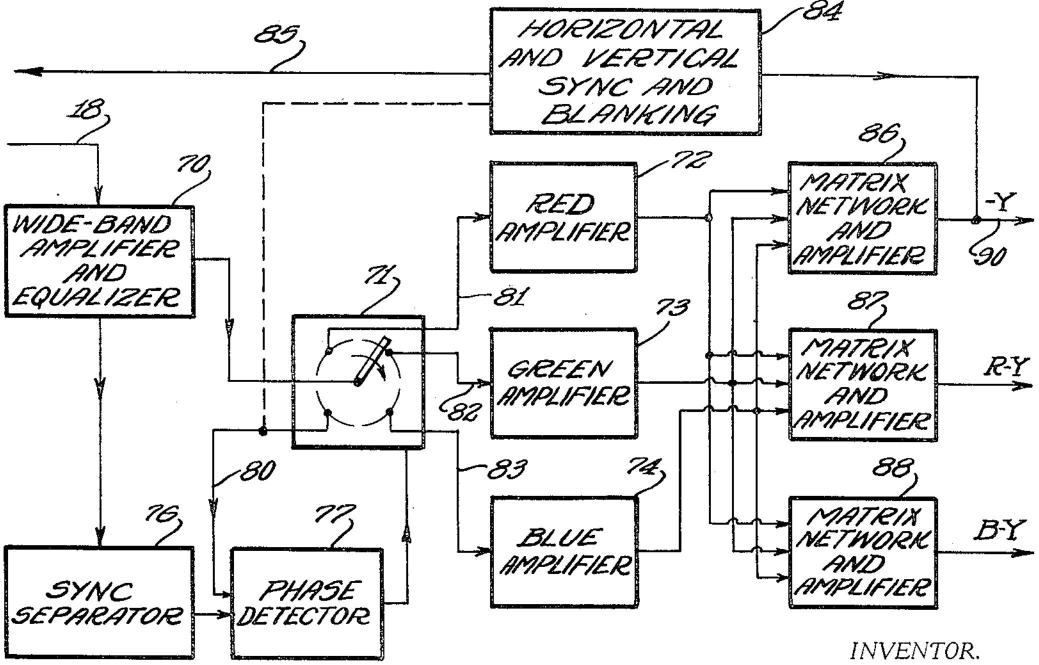
FIG. 4 is a circuit diagram showing an electric circuit for use with the camera of FIGS. 1–3.

In order to generate a relatively distinct synchronizing signal even in the absence of a substantial light source exterior to the camera, an internal source of light may be provided as indicated at 50 with a suitable diffuser covering the source such as indicated at 51. By way of example, the source 50 may comprise a peripherally disposed series of miniature lamps near the edges of the mask 21 energized from a variable direct current supply indicated at 52. The diffuser may be of a material such as milk glass. Thus, in the absence of an external light source, there will still be alternate illuminated areas and dark areas on the target region **16*a* of the tube 11 with the dark areas producing output pulses separated by the scan time of 0.18 microsecond, for example, previously referred to. These sync pulses can be utilized for separating the different color signals for example with a circuit such as illustrated in FIG. 4. Even without external illumination therefore, a waveform such as indicated at 55 in FIG. 5 will appear at lead 18, FIG. 1, caused by the internal light source 50. The internal light source 50 is preferably adjusted to provide a relatively dim illumination of the target region 16*a* of the image tube so that the positive pulses such as indicated at 56** in FIG. 5 representing the illuminated areas in the absence of an external light source will have a relatively low amplitude in relation to amplitudes produced by external light sources.

Figures 5, 6, 7, 8, 9:
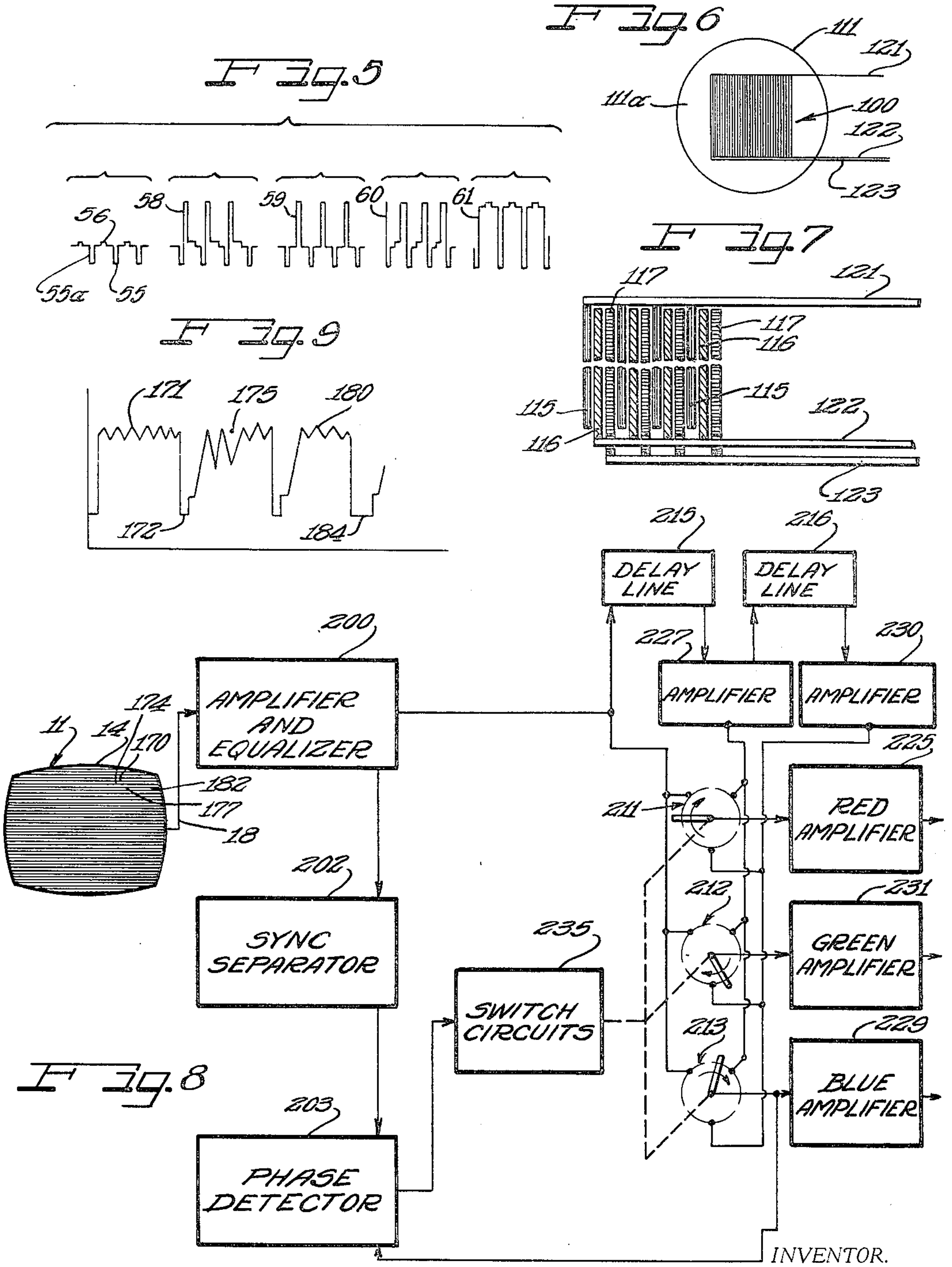
FIG. 5 is a diagrammatic view illustrating waveforms of the signal from the camera of FIGS. 1–3 after amplification and equalization.
FIG. 6 is a diagrammatic partial side elevational view showing the interior target face of a modified color television image tube in accordance with the present invention.
FIG. 7 is an enlarged partial diagrammatic view showing details of the target for the modified image tube of FIG. 6.
FIG. 8 is a circuit diagram showing an electric circuit for a modified color television camera in accordance with the present invention wherein the color stripes of the color mask extend parallel to the direction of horizontal deflection of the image tube.
FIG. 9 is a diagram showing the waveform of the output from the target face of the modified image tube of FIG. 8.

With the camera 10 receiving a red light, the output waveform at 18 would be generally as indicated at 58, for example, while with a green light input, the signal would be as indicated at 59, and with a blue light input the signal would be as indicated at 60 in FIG. 5. With a white light input, the signal would generally be as indicated at 61 in FIG. 5.

Referring to FIG. 4, the output conductor from the image tube 11 is indicated at 18 leading to a wide band amplifier and equalizer component 70. The output of this component is supplied to electronic sequencing switch 71 which serves to supply waveforms such as indicated at 58, 59 and 60 to red amplifier component 72, green amplifier component 73 and blue amplifier component 74, respectively. The sync signal such as represented at 55 in FIG. 5 is segregated by a sync separator component 76 and then constitutes one input to a phase detector component 77 whose output is utilized to control the switch 71. The sequencing switch 71 is illustrated as coupling to four output lines 80, 81, 82 and 83 for equal time intervals in each cycle, one of the output lines 80 serving as the second input to the phase detector 77. The output control voltage from the phase detector 77 may be utilized to control the phase or frequency of the electronic switch 71 so that the pulses supplied by the sequencing switch via line 80 are locked in synchronism with the pulses 55 from sync separator 76.

The electronic sequencing switch 71 may include a ring counter with four stages controlling respective ones of four electronic gates. Each of the electronic gates has a second input connected to component 70, and the outputs of the gates are connected to conductors 80–83, respectively. Alternatively, the switch 71 may comprise an oscillator with phasing circuits which operate the four gating circuits one after the other. The electronic sequencing switch is kept in synchronism with the scanning beam 12 by virtue of the fact that the sync pulses such as indicated at 55 in FIG. 5 are automatically synchronized with the movement of the beam 12. A suitable source of conventional horizontal and vertical synchronizing and blanking pulses is indicated at 84 which supplies the image tube 11 via conductor 85.

Instead of the use of phase detector 77 with a feedback connection at 80, the separated sync pulses from component 76 can be used to trigger the switching cycle. For example the sync pulses may control a multivibrator which in free-running condition would operate at a nominal frequency corresponding to the color sampling rate, and the four stage ring counter previously mentioned may be driven by the free running multivibrator. As another example, the sync pulses such as 55 could trigger a first monostable multivibrator which after a time delay corresponding to the color sampling interval could trigger a second monostable. The second monostable could hold open a gate associated with the input to the red amplifier 72 for the color sampling interval (.045 microsecond, for example) after which a third monostable would be triggered by the second monostable to open a gate interposed between the component 70 and the green amplifier 73 for a corresponding time interval. A fourth monostable would be triggered by the third monostable after the same time delay and open a gate associated with the blue amplifier component 74 for the same color sampling interval. Thereafter the next sync pulse 55 would trigger the first monostable (at leading edge 55$a$) to begin a new cycle.

The color amplifiers 72–74 have gain and gamma correction as needed for the relative overall sensitivity, color mask losses, shading, and so forth. The corrected signals are supplied to matrix network and amplifier components 86–88 which serve to supply, for example, —Y, $R-Y$ and $B-Y$ signals, respectively. The component 84 may supply the usual horizontal and vertical sync pulses to the —Y output line 90 for timing the monitor sweep circuit and/or to give a composite video signal for recording.

It will be appreciated that the specified time interval of 0.18 microsecond between successive sync pulses 55 in FIG. 5 is simply by way of example. If there were 100 dark segments corresponding to color mask opaque stripes 22 within the raster of the image tube 11, the interval between sync pulses might be 0.53 microsecond, for example.

An alternative system is shown in FIGS. 6 and 7 wherein the image tube such as indicated at 111 is provided with a modified target or photosensitive region 100 at the interior of its end wall 111$a$. In the embodiment of FIGS. 6 and 7, the transparent conductive layer corresponding to layer 15 in FIG. 1 and the photoconductive layer corresponding to layer 16 may be subdivided into three sets of stripes insulated from each other as shown in the magnified diagrammatic view of FIG. 7. Thus, the target 100 of the modified image tube 111 may comprise respective sets of segments or stripes 115, 116 and 117 whose transparent conductive layers are connected to respective bus bars 121–123. For a three color system, three sets of segments are required as illustrated in FIG. 7 and one of the sets such as the set of segments 117 crosses over an insulated layer on one of the bus stripes such as 122 to reach its bus stripe 123. A two color system would have only two sets of intermeshed stripes with one connecting bus at the top and one at the bottom and no cross overs. All of the systems described herein are adaptable for two color operation with greater economy or may be expanded for more colors.

Each set of stripes or segments receives light of a particular color. For example the segments 115 may receive red transmitted light from the scene being televised, segments 116 may receive green light from the scene, and segments 117 may receive blue light only from the scene to be televised. The target 100 may be constructed by photoetching and deposition techniques similar to those used for microcircuits, transistors, etc.

By way of example, applying the embodiment of FIGS. 6 and 7 to the system of FIG. 1, the image tube 111 would be substituted for the image tube 11, and the color mask 21 would be replaced by a similar color mask having only three stripes per set each having a width approximately ⅓ the pitch or distance between successive sets with the opaque stripes 22 omitted. In this case the red stripes of the color mask corresponding to mask 21 would be in alignment with the segments 115 of the target 100, the green stripes of the color mask would be in alignment with the segments 116 and the blue stripes of the color mask would be in alignment with the segments 117.

In this case, the bus bar 121 would be connected directly to the red amplifier component 72 of FIG. 4, the green bus stripe 122 of the target 100 would be connected directly to the green amplifier component 73, and the blue bus stripe 123 would be connected to the input of the blue amplifier component 74. As previously, these amplifiers could be adjustable in gain to compensate for different sensitivities to the respective colors and other factors. The output of the amplifier components 72–74 would then correspond to the waveforms 58, 59 and 60, respectively, except that the synchronizing pulses 55 would be absent, and each pulse such as the pulse 58 would have a duration of the order 0.06 microsecond, for example, where there were 300 sets of segments 115–117 and where the line scan interval was 53 microseconds. In other words, pulses such as 58, 59 and 60 together would occupy the set scan time of about 0.18 microsecond. The components 72–74 could provide any necessary equalization of the amplitudes of the respective pulse outputs from the target 100; component 70 of FIG. 4 would be omitted as well as components 71, 76 and 77. Since the synchronizing pulses such as indicated at 55 in FIG. 5 are omitted for the embodiment of FIGS. 6 and 7, the internal illumination source 50 would be omitted for this embodiment. These simplifications are at the expense of the requirement for a special and more complicated image tube 111.

For accurate registration of the color segments of the light image with the respective segments 115–117 of the target 100, the same master bar pattern may be used for making both the color mask corresponding to the color mask 21 and for making the Vidicon target 100 shown in FIGS. 6 and 7. Alternatively, the color mask may be made photographically using the target 100 as a master.

As a modification of the embodiment of FIGS. 6 and 7 just described, a color bar pattern may be deposited directly on the interior face 111*a* of the Vidicon tube 111 with the conductive and photoconductive layers forming the segments 115–117 deposited over the color mask layer. In this modification, a red filter layer would be interposed between the interior face 111*a* and each of the segments 115, a green transmitting filter layer would be interposed between the face 111*a* and each of the segments 116, and a blue transmitting filter layer would be interposed with and in alignment with each of the segments 117 and interposed between such segments and the interior face 111*a* of the tube 111. The color mask and lens system of FIG. 1 is then unnecessary, the scene being focused directly on the Vidicon face by a conventional lens.

A second modification of the embodiment of FIGS. 6 and 7 would be to provide a registered color mask directly at the exterior face of the end wall of the tube 111. Such external mask could be made photographically using the target 100 or its replica as a source so that any errors are matched and compensated. Preferably the end wall of the Vidicon 111 could be very thin for minimum parallax effect. An external color mask may be aided by fiberoptics extending through the end wall of the vidicon tube 111. Alternatively, special optics may be utilized in the optical section 20 so as to provide a nearly parallel ray image within the section 20 and impinging upon the end face of the image tube 111.

FIG. 8 illustrates a system generally corresponding to that shown in FIG. 1 except that the color mask corresponding to the color mask 21 is arranged so that the color stripes corresponding to stripes 23–25 run horizontally or parallel to the horizontal scan direction of the Vidicon tube 11 rather than running vertically as described in reference to FIG. 1. With a horizontally striped color mask, the "color-sync" rate is substantially reduced and possible vertical striping in the reconstructed picture at a television receiver is, of course, avoided. FIG. 8 specifically illustrates by way of example the case of a conventional Vidicon tube 11 where the target layers 15 and 16 are continuous rather than the case where the target is itself segregated into stripes. If the color mask is identical to the mask 21 turned through 90°, then the synchronizing pulses would occur only at the time when the beam finished scanning a blue line and then actually scanned a dark area on the tube face corresponding to one of the opaque stripes 22. In the embodiment actually illustrated in FIG. 8, however, the light pattern appearing on the tube end face 14 preferably comprises color stripes disposed in the direction of horizontal scanning and alternating red light, then green light, then blue light, then red light again so that the output would correspond to that illustrated in FIG. 9 wherein as the first stripe 170 is scanned, a signal as indicated at 171 is produced representing the variation in intensity of the red light from the scene being televised, the portion 172 of the waveform of FIG. 9 corresponding to the horizontal retrace interval. As a second color stripe 174 is scanned which may receive green light from the image to be televised, a signal as indicated at 175 may be produced at the output lead from the target face indicated at 18 in FIG. 8. Similarly as the region 177 is scanned which receives blue light from the scene being televised, a signal as indicated at 180 may be generated at lead 18. For synchronizing purposes, opaque regions may be provided on the color mask to produce dark spots at 182, for example, on the target.

An opaque area on the color mask at the end of each stripe region corresponding to the segments 177 in FIG. 8 would produce uniformly occurring dark spots as indicated at 182 on the tube face and this might result in a synchronizing pulse as indicated at 184 at the trailing part of the signal region 180. Such a dark region 182 might occur at the end of each line, as another example. This sync locks switches 211–213 to the correct color, the pulse width sync separation being similar to horizontal and vertical separation in conventional television circuits.

The output of the target would be supplied via lead 18 to an amplifier and equalizer component 200 with the synchronizing pulses 184 separated by means of a sync separator component 202 and supplied as one input to a phase detector 203. The output of the amplifier and equalizer component 200 would also be supplied to one input of each of a series of electronic switches 211–213 and to the input of a pair of delay lines 215 and 216. If the scanning beam 12 were beginning to scan the segment 170, electronic switch 211 would connect component 200 to the red amplifier 225. At the same time the output of delay line 215 will be supplied through amplifier component 227 and switch component 213 to the blue amplifier 229, while the output of delay line 216 will be supplied through amplifier 230 and electronic switch 212 to the green amplifier component 231. In this way the blue amplifier 229 will have been supplied with the output from the target 14 produced by the scanning of a preceding blue stripe, and the amplifier 231 will be supplied with the output of the target which was generated during the scanning of a preceding green stripe on the target face. The switch control circuit 235 is coupled to the switch elements 211–213 so that the switch elements complete a cycle in a time interval corresponding to the scanning of three lines on the tube face, the switches rotating together in a clockwise direction. Thus, when the beam begins scanning the green stripe such as indicated at 174, the output from the component 200 at this time will be supplied by switch element 212 to the green amplifier 231, and the previously generated red signal will be supplied from the output of delay line 215 through amplifier 227 through switch 211 to the red amplifier 225. Similarly when the beam begins scanning the blue stripe 177, the electronic switch element 211 will supply the output from delay line 216 and amplifier 230 to the red amplifier component 225. In this way the output of the red amplifier component 225 will be a continuous sequence of red lines, each red line which is scanned by the beam being repeated twice to fill in the intervals when green and blue stripes are being scanned on the tube face; and likewise the green and blue signals are repeated in their respective amplifiers to give continuous color information.

The system of FIGS. 8 and 9 is otherwise similar to the system of FIG. 1–5, and the same modifications are applicable.

In the system of FIGS. 8 and 9, where interlaced scanning is utilized, the stripes such as indicated at 170, 174 and 177 may have a width which is twice the width which is twice the width of the scanning line generated by the beam 12, so that in scanning a first field, the beam may scan along a top part of the stripe 170, then along the top part of the stripe 174 and so forth, while in generating the second field, the beam may scan along a lower half of the stripe 170 then along a lower half of the stripe 174. Where a dark area such as indicated at 182 is to be utilized for generating a sync mark as indicated at 184 in FIG. 1, the illuminating means 50 of FIG. 1 may be employed so that the sync mark is generated even with a dark scene being viewed externally. The lamps 50 may be arranged in a vertical line at each side of the color mask with the diffusers such as indicated at 51 lying in a vertical plane and extending for the height of the color mask 21.

Any off-registration between the scanning beam and the successive stripes such as indicated at 170, 174 and 177 may be averaged out over two or more lines using output of the delay lines for averaging, or may be greyed out so as not to be objectionable. The horizontal bar method is less stringent on the electronic switching and on the horizontal resolution and bandwidth requirements of the Vidicon tube and associated electronics. The color amplifiers 225, 231 and 229 would be connected to matrix network and amplifier components corresponding to 86–88 in FIG. 4.

The outputs from any of the color cameras disclosed herein may be utilized to generate a standard NTSC modulated carrier as with conventional color camera outputs. The carrier output from the camera may be of a proper frequency and of low power for feeding via an antenna such as indicated at 250 in FIG. 10 to the antenna 251 of a standard NTSC color television receiver 252. The carrier may be in a VHF or UHF channel not being used by television broadcasters in the vicinity. A portable camera 260 in accordance with any of the embodiments of the present invention may be battery operated and may include a microphone 265 for sound pick-up and suitable control circuits such as indicated at 266 for controlling a color or monochrome tape recorder such as indicated at 270. Thus, the camera 260 can be quite portable, and handled in the same way as a film camera. The control signal may be transmitted by the antenna 250 on a subcarrier, for example, and may be supplied to a control circuit 276 at the receiver for starting and stopping the recorder 270 and the like. The receiver and recorder may also be portable, and located nearby in an automobile or boat, or may be set on the ground or carried by a shoulder strap. The camera may include a miniature monitoring kinescope if desired.

Figure 10:
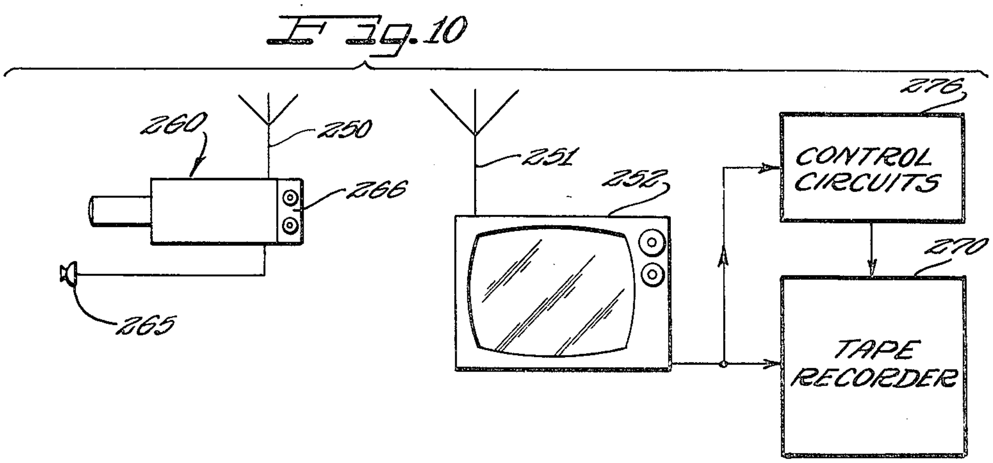
FIG. 10 illustrates a portable camera system in accordance with the present invention.
Figures 11, 12, 14:
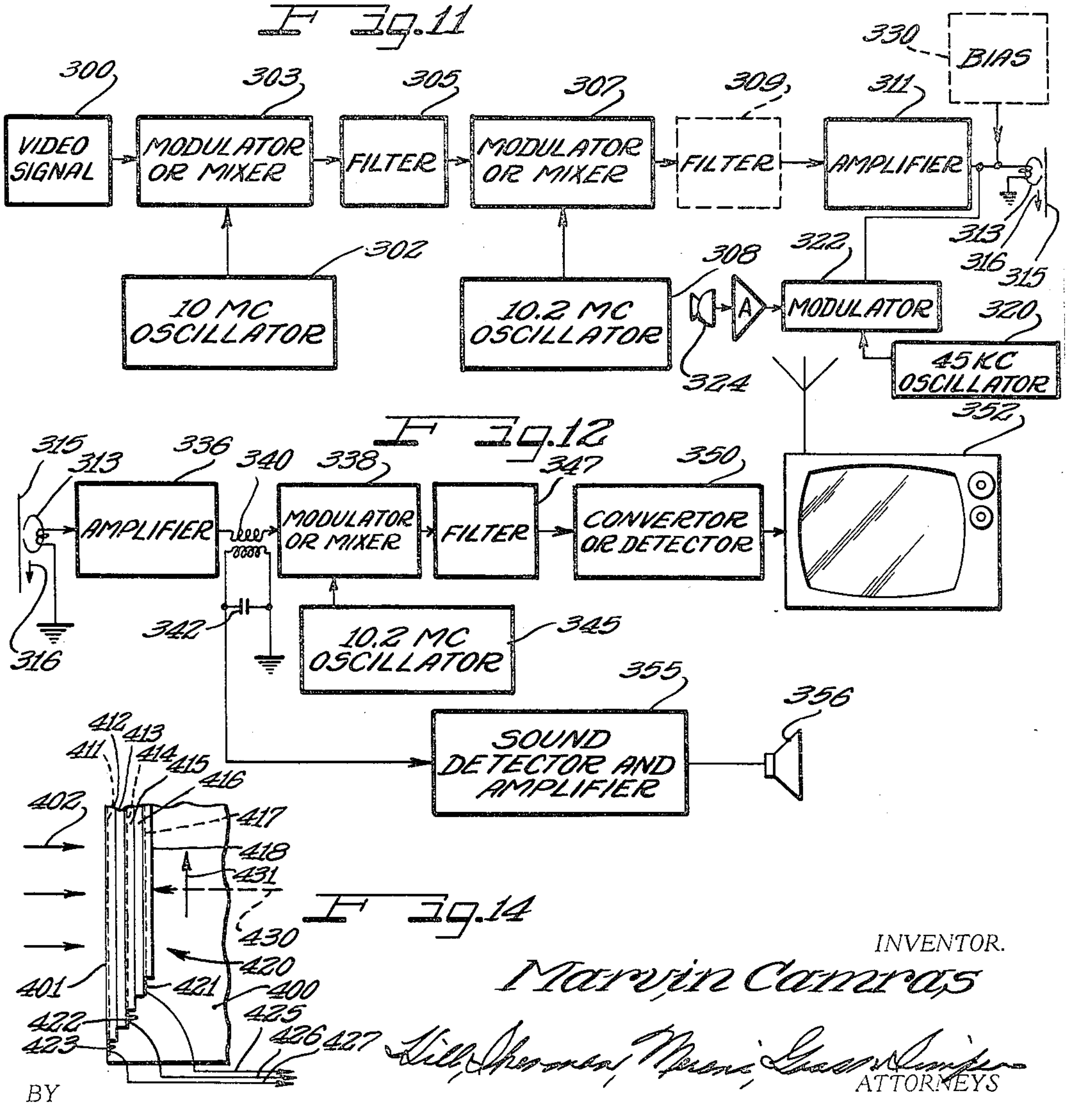
FIG. 11 illustrates a color television recording system in accordance with the present invention.
FIG. 12 illustrates a color television playback system in accordance with the present invention.
FIG. 14 is a diagrammatic enlarged longitudinal sectional view illustrating a special color image tube which enables a relatively simple optical system in comparison with certain of the alternatives described in connection with FIGS. 6 and 7.

FIG. 11 illustrates a preferred method for recording the monochrome and/or color components of a video signal. The video signal source 300 in FIG. 11 may, for example, comprise the —Y output from matrix component 86 of FIG. 4, or may comprise the —Y output from television receiver 252 in FIG. 10, for example. By way of example, the video signal supplied from component 300 may have a bandwidth from 60 cycles per second to 2 million cycles per second. This output is heterodyned with a 10 megacycle per second oscillator 302 in a mixer component 303 to give upper sidebands from 10,000,060 to 12,000,000 cycles per second, and lower sidebands from 8,000,000 to 9,999,940 cycles per second. The upper sidebands are removed by a filter component 305, except for a vestigial portion below 10.2 mc. that may be retained. The 10 megacycle per second carrier and lower sidebands are then fed to a second mixer component 307 having a local oscillator 308 operating at a frequency of 10.2 megacycles per second, yielding a lower sideband portion ranging from 200,060 cycles per second to 2,200,000 cycles per second with a carrier at 200,000 cycles per second and vestigial sideband information ranging from about 60,000 cycles per second to 200,000 cycles per second. The upper sidebands from the second mixer 307 are removed by a second filter 309 which may simply be amplifier and recorder circuits that will not pass these higher frequencies. The resulting signal extending over a frequency range from 60,000 cycles per second to 2,2000,000 cycles per second is supplied to amplifier component 311 and has a bandwidth within the capabilities of the recording system diagrammatically represented by a recording head 313 cooperating with a tape record medium 315 moving in the direction of arrow 316. A 45,000 cycle per second carrier is indicated at 320 and is supplied to a frequency or amplitude modulator component 322 for modulation by means of a sound input from transducer 324. The sound carrier with its sidebands is accommodated at the lower end of the video band and thus may be added to the recording head 313 for recording on the same channel of the tape 315 as the video information.

An optional bias supply is indicated at 330 which may supply high frequency alternating current having a frequency of 6 megacycles per second or higher, for example, or may supply a direct current bias to the recording head 313. Additional carriers in the range from 25,000 to 150,000 cycles per second may be used for stereo sound, control signals and the like if desired.

A means for reproducing the tape 15 recorded by the system of FIG. 11 is illustrated in FIG. 12. The reproduced signal is supplied from the playback head 313 to an amplifier 336 whose output is coupled to a mixer 338 through the primary of a transformer 340 whose secondary is tuned by means of a capacitor 342 to the frequency of the audio carrier, for example 45 kilocycles per second. The reproduced signal frequencies in the range from 60,000 to 2,200,000 cycles per second are supplied to mixer component 338 having a local oscillator 345 operating at a frequency of 10.2 megacycles per second which may be the same one as used during recording in FIG. 11. The output of the mixer 338 thus includes a lower sideband region ranging from 8,000,000 to 10,140,000 cycles per second with a 10 megacycle per second carrier, and the upper sideband region extending from 10,260,000 to 12,400,000 cycles per second with a 10.4 megacycle per second carrier. Either set of sidebands and carrier are removed, as are the directly played back video signals, as for example by means of a filter 347 which passes the frequencies between 8 megacycles per second and 10,140,000 cycles per second only. The output of filter 347 is supplied to an amplitude modulation detector component 350 such as a diode detector to give the video signal in its original frequency range from 60 cycles per second to 2 megacycles per second. The output video signal is supplied at an appropriate point of a television receiver such as indicated at 352, for example, for visual display in the usual manner. The sound signal is applied to a sound detector and amplifier component 355 and then to a loudspeaker 356. The video signal recorded and reproduced by the systems of FIGS. 11 and 12 may include conventional horizontal and vertical synchronizing portions which may be utilized in the reconstruction of the picture by means of the receiver 352.

Some of the advantages of the carrier system illustrated in FIGS. 11 and 12 are listed below:

(a) The system provides relative freedom from cross talk between channels (where the video signal is recorded on adjacent channels in the longitudinal direction) which cross talk takes place particularly at long wavelengths. With the illustrated system, the longest wavelength for a tape 315 moving at 60 inches per second is less than 0.0015 inch at the 45 kilocycle per second sound carrier frequency. A related advantage is relative freedom from head contour effects which also occur at long wavelengths.

(b) The system of FIGS. 11 and 12 provides a recorded carrier having a frequency near the long wavelength (low frequency) range of the recorder system where it is relatively immune from dropouts and noise.

(c) The system of FIGS. 11 and 12 provides a recorded carrier signal which varies in the same way as and together with the sideband information in the presence of speed variations of the record medium so that upon beating the carrier against the sidebands the original intelligence is restored (not harmed by record speed variations any more than if the direct video bandwidth were recorded and played back).

(d) In the system of FIGS. 11 and 12, a loss of high frequency response in the recording system will affect only the upper frequency components of the system, and will not cause the loss of the video carrier signal or sound, thus a record is practical having a much more restricted upper frequency response characteristic than previously used carrier recording systems.

(e) In the system of FIGS. 11 and 12 either amplitude modulation or frequency modulation may be used for the video, the frequency modulation system having a discriminator prior to the final detector such as indicated at 350 in FIG. 12.

The video signal to be recorded need not originate as a demodulated signal, but may be heterodyned from the IF system of a television receiver, etc. Thus the video signal source 200 may supply the video signal on an intermediate frequency carrier, in which case the frequency of the local oscillator 302 would be selected so as to provide an output frequency range such as that from 8 megacycles per second to 9,999,940 cycles per second as previously mentioned. The playback output from mixer component 338 in FIG. 12 may also be at the receiver intermediate frequency such as 45.75 megacycles per second in which case the output of the mixer 338 would be supplied to the IF circuits of the receiver 352, for example.

The other color television components such as the *R—Y* and *B—Y* signals from components 87 and 88 in FIG. 4 may be recorded using the same system as illustrated in FIGS. 11 and 12, for example by the use of two additional fixed longitudinal gap recording heads such as 313 cooperating with additional channels on the record tape 315.

Figures 13, 15, 16:
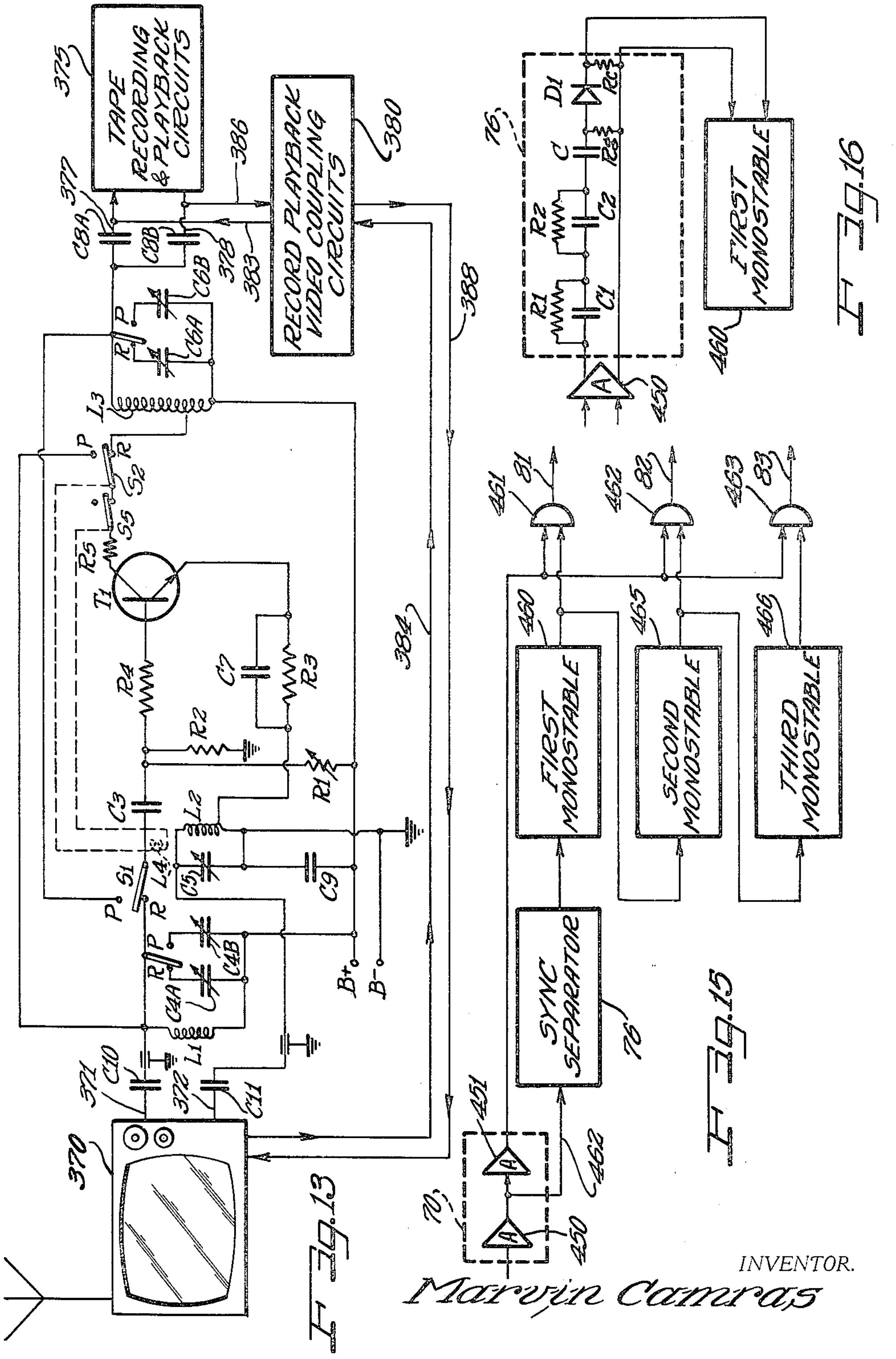
FIG. 13 illustrates a preferred circuit for recording and reproducing the sound which accompanies the color picture information.
FIG. 15 is a diagrammatic view giving an example of electronic sequencing switch circuitry for the embodiment of FIG. 4.
FIG. 16 is a diagrammatic view giving an example of circuitry for the sync separator component of FIG. 15.

FIG. 13 illustrates a particularly advantageous circuit for recording the sound which accompanies the picture information. For example, the system of FIG. 13 may be associated with the TV receiver 252 of FIG. 10. In FIG. 13 a standard commercial broadcast color television receiver is indicated at 370 for supplying a sound signal on a 4.5 megacycle per second frequency modulation carrier at conductor 371 and for supplying a 3.58 megacycle per second carrier at conductor 372. By way of example in an RCA Model CTC16 color television chassis, conductor 371 may be connected to pin 1 of sound demodulator tube V202, while conducted 372 may be connected to pin 7 of the X demodulator tube V704. The various selector switches of the circuit of FIG. 13 are shown in their respective record positions indicated by the letter "R". For playback mode, the switches are switched to the "P" position. The circuit uses the 3.58 megacycle per second crystal controlled oscillator of the color television receiver 370 to heterodyne the 4.5 megacycle per second frequency modulated sound to 0.92 megacycle per second, the latter being a carrier that is readily recorded by means of a relatively low speed video tape recorder such as indicated at 375. For playback, the 0.92 megacycle per second frequency modulated sound carrier may be changed to a sound signal by an appropriate discriminator and detector, or for simplicity may be heterodyned back to 4.5 megacycles per second and the circuits of receiver 370 are utilized for demodulation. With the switches in the record (R) position, circuit L1, C4A tuned to approximately 4.5 megacycles per second is connected to the base of transistor T1 which may be a type 16L64 or 2N3856A or 2N708. The circuit L2, C5 is tuned to 3.58 megacycles per second and is connected to the emitter circuit of transistor T1. The circuit L3, C6A is connected to the collector and supplies as much as 70 volts peak to peak signal in the tank circuit that is coupled to the recording head circuits component indicated at 375, which may be a color recording head circuit.

During playback the switches are in the P position, connecting the base of transistor T1 which again acts as a mixer circuit to the 0.92 megacycle per second tank circuit including inductor L3 and capacitor C6B. It has been found that different tuning is optimum for playback as compared to recording, so that different tuning capacitors C6B and C4B are switched in for playback. For example during recording the tank circuit L3, C6A may be peaked at a frequency above 0.92 megacycle per second so that its output voltage at 0.92 megacycles per second is 50% of the peak value; and similarly L1, C4A may be peaked at 4.5 megacycles per second, or at a frequency above 4.5 megacycles per second such that is its output voltage at 4.5 megacycles per second is 50% of peak value. During playback capacitors C6B and C4B are adjusted for minimum distortion and good volume of sound. Resistor R1 is adjusted during playback for minimum distortion and good sensitivity. The 4.5 megacycle frequency modulated output is thus fed to the TV set sound discriminator, detector, audio amplifier, and loudspeaker. It has been found that the sound and color signal do not interfere with each other when recorded and played back on the same magnetic recording track. The conductors 337 and 378 in FIG. 13 would connect to terminals designated by the circled numbers 8 and 15 in the cable between the recorder and TV set of our application Ser. No. 528,934 filed Feb. 21, 1966 in which this sound system may be used. A duplicate sound channel for stereo may be used with the other color channel.

Having reference to FIG. 13, the tape recording and playback circuits component 375 and the record-playback video coupling circuits component 380 of FIG. 13 may correspond to the circuit illustrated in the fourth figure of my copending application Ser. No. 528,934. In this case, the audio circuitry of FIG. 13 would preferably be located in the adaptor circuit 255 of part *b* of the fourth figure of said copending application. Conductor 377 would lead to conductor number 8 of cable 256 of said part *b*. Thus conductor 377 would be connected to the juncture of inductor L6C and conductor 38 of part *a* of said fourth figure, so that the audio signal on the .92 megacycle per second carrier would be supplied through secondary winding 23*c* to conductor 39. The conductor 39 would then connect to a head unit such as indicated at 22 in the first figure of said copending application through a selector switch having record and play positions as indicated in said part *a*. The winding 26 would have its upper terminal grounded through a record-play selector switch in the same way as illustrated for winding 24 in said part *a*.

During playback, the aforementioned selector switches of component 375 would be in the play position so as to connect windings 26 and 66 of the head 22 shown in the second figure of said copending application to a playback amplifier such as indicated at 76 in said second figure. The output of this playback amplifier 76 of component 375 would supply the playback signal to conductor 378 of FIG. 13 whereupon the sound signal on the .92 megacycle carrier would be coupled through capacitor C8B to the tank circuit L3, C6B. The resulting sound signal with a 4.5 megacycle per second carrier would be supplied through capacitor C10 and via conductor 371 to the television set 370, for example to pin 1 of sound demodulator tube V202 of the RCA Model CTC16 chassis. Conductor 372 would be connected to pin 7 of the X demodulator tube V704 of the same chassis so as to receive the 3.58 megacycle per second signal which heterodynes with the 0.92 megacycle per second carrier to give the 4.5 megacycle per second modulated sound signal.

Referring to FIG. 13, conductor 383 leading from component 380 might serve to couple the output of the *B—Y* amplifier tube V706B of said chassis to the component 375. In this case conductor 384 leading from the receiver 370 would be connected to pin 6 of tube V706B of said chassis. Similarly, the reproduced color video signal on conductor 378 would be supplied via conductor 386 to component 380 and then to conductor 388. Conductor 388 in turn would be connected to conductor 216 of part *b* of the fourth figure of said copending application which conductor 216 leads to a capacitor 155 and then to pin 7 of the tube V706B of said chassis.

With this arrangement, the separate audio head, audio amplifier and audio biasing system of said copending application could be omitted. It is found advantageous to connect a series inductor and capacitor between the plate of audio output tube V106 and ground, of said chassis, the inductor having a value of about .15 henry and the capacitor having a value of about .0025 microfarad.

The foregoing specific circuitry is, of course, simply given by way of specific example.

Referring to FIG. 14, (on sheet 3 of the drawings) there is illustrated diagrammatically a television camera tube 400 having a transparent end wall 401 on which a light image is focused as indicated by the arrows such as 402. In this case there is no color mask interposed in the light path such as represented at 402 so that all color components of the scene being televised are included in the image focused on the end wall 401. Deposited at the interior surface of the end wall 401 are a series of extremely thin layers such as diagrammatically indicated at 411–418. These layers have the purpose of converting the color components of incoming light into separate electrical outputs at different segments of the target generally designated by the reference numeral 420. For example, for the case of three color components, layers 412, 415 and 418 may comprise segments of photoconductive material which respond to different color components of the light image which is focused on them. The layers indicated by dash lines at 411, 414 and 417 may be of transparent electrically conductive material as tin oxide and may be connected to respective electrically conductive edge rings 421–423 connecting with conductors 425–427. By way of example, layer 412 may have its peak sensitivity in the blue part of the spectrum, layer 415 may have its peak sensitivity in the green part of the spectrum and layer 418 may have its peak sensitivity in the red part of the spectrum. The active layers are separated by insulating layers 413 and 416 for example of silicon monoxide. Color filter layers may be immediately sandwiched between layers 413 and 414 and between layers 416 and 417, or the color filter material may be included as coloring matter in the insulating layers 413 and 416 or the filtering may be accomplished by interference of light in the thin layers. By the use of such layers, the target segment 415 may have sensitivity to colored light that also affects segment 412; for example segment 415 may be sensitive to both green and blue light, but the blue light is filtered out by layer 413, so that segment 415 gives green output only. Similarly segment 418 may be sensitive to blue, green and red light, but receives only red light since the blue is removed by layer 413 and the green is removed by layer 416 before reaching segment 418. The optional use of filter layers thus broadens the choice of photosensitive materials. Other combinations of photosensitive materials, filters, and corrective amplifiers and matrices may be chosen. The same principles may also be applied to photoelectric or photovoltaic materials as well as photoconductive materials. The layers 411–418 are very thin, in the order of a micron (one millionth of a meter) or less, and are preferably vacuum evaporated in succession on the interior surface of the end wall 401.

In this embodiment, the optical system is simple, requiring only a lens to focus the scene onto the target. The electronics are also simplified, since the electrical outputs at conductors 425–427 are connected directly, for example, to respective red, green and blue amplifiers. These amplifiers may, of course, be connected to matrixing circuitry such as indicated at 86–88 in FIG. 4. The matrixing system may, however, be non-standard, depending on the color balance produced by the target 420. The layers 411–417 are, of course, transparent to light so as to enable, for example, blue light to reach layer 412, green light to reach layer 415 and red light to reach layer 418 from the external scene.

While any suitable scanning means such as that illustrated in my copending application Ser. No. 495,495 filed Oct. 13, 1965 could be adapted to the concept of FIG. 14, in the embodiment specifically illustrated an electron beam 430 traces the target area by means of a succession of horizontal scans such as indicated by arrow 431 in the same manner as with a conventional Vidicon tube. Thus, the tube 400 may be the conventional Vidicon tube, but with a modified target, and the electron beam 430 having sufficient velocity so as to charge each of the photoconductive layers 412, 415 and 418 so that each layer will operate as a separate Vidicon type circuit.

In each of the color mask embodiments as FIG. 2, the mask pattern need not be linear, but may be distorted such that it generates a constant frequency in response to scanning even though the scan beam velocity is nonlinear.

An example of mixing primary colors in the matrices 86—88 may be as follows: $-Y=0.3R-0.59G-0.11B$; $R-Y=0.7R-0.59G-0.11B$; and $$B-Y=-0.3R-0.59G+0.89B$$

where R refers to the red color component from amplifier 72, G refers to ths green component from amplifier 73 and B refers to the blue component from amplifier 74.

The color filters utilized in conjunction with the bar pattern for producing color mask on color photographic film may, for example, comprise Wratten No. 47 for the blue transmitting filter, No. 58 for the green transmitting filter, and No. 25 for the red transmitting filter.

The —Y signal and especially the color output signals are blended when their bandwidth is limited, such that the stripe pattern is not visible.

A sync stripe may be used after each color stripe of the color mask to give a higher frequency less conspicuous pattern.

A set of lenticular elements against the end wall of the color tube might be used in place of the color mask with wide strips of color filter material at the lens, parallel to these elements. Instead of an opaque mark to produce synchronizing, the internal light from source 50 may be at one of the primary colors, thus giving a stronger output at this color which is used for synchronizing purposes. Other means of providing synchronizing might be the provision of one signal at the beginning or end of each line with accurate registration of the scanning beam with such signal and provision for suitable adjustments. As another alternative, a reference set of bars of opaque characteristic alternating with transparent portions may be provided at the top or bottom of the target and scanned by an exra beam, or remembered by a recirculating delay line.

In the case of the use of lenticular elements, each line of the scene being televised would produce three adjacent and parallel line segments on the target each of a different color, and these line segments could be scanned by scanning lines extending transversely to the line segments or by scanning lines extending parallel to the line segments as in the previous embodiments.

A sound and color picture was recorded and played back using the circuit specifically described with reference to FIG. 13 wherein the various components had values as follows: R1, 0–560,000 ohms; R2, 15,000 ohms; R3, 470 ohms; R4, 560 ohms; R5, 470 ohms; C3, .02 microfarad; C4A and C4B each 9 micromicrofarads to 180 micromicrofarads; C5, 9 micromicrofarads to 180 micromicrofarads; each of C6A and C6B, 80 micromicrofarads to 480 micromicrofarads; C7, .02 microfarad; C8A, 10 micromicrofarads; C8B, 10 micromicrofarads; C9=0.05 microfarad; C10, 5 micromicrofarads; C11, 5 micromicrofarads; L1, 28 turns; L2, 28 turns; L3, 24 turns below the tap and 50 turns above the tap; L1 and L2 being wound on a ¼" diameter by 1" long powdered iron coil form, and L3 on a ⅜" by 1" long powdered iron coil form. The small capacitances C10 and C11 couple the high frequency TV receiver circuits to the shielded cables which are part of the tuned circuits of FIG. 13 with negligible disturbance to the receiver circuits.

A modified image tube may be used having three target areas spaced side by side horizontally and with lenses, mirrors and filters that display three side by side images each of a different primary color in respective segments of the target area. The segments are spaced apart a distance equal to the horizontal blanking interval as for example 16% of the horizontal scan time, and the electron beam in the camera tube is swept horizontally at ⅓ its usual rate such that each image is scanned in the usual 1/15,750 second. A single target conventional Vidicon tube may be used with a circuit such as shown in FIG. 8 to switch successive lines to the correct color channels. Alternatively, the target may be subdivided according to the three color segments, each output going to a color amplifier as in FIG. 14 so that the sequencing circuitry is omitted. In either case it is desirable to use the delay line method of FIG. 8 to repeat each color while the others are being scanned so as to give continuous color information in each color channel.

All of the descriptions of three color systems in this specification apply as well to two color systems which may be chosen because of greater simplicity or economy.

Many of the embodiments herein have the advantage of utilizing a single image tube of conventional construction with standard monochrome circuits for focusing, deflection and the like, and with an optical system that is readily adapted to the front end of a standard monochrome camera.

Other colors can, of course, be chosen rather than red, green and blue as in the illustrated embodiments. The sync marks in the embodiment of FIGS. 1–3, for example, may be considerably narrower than the color bars, or one or more of the color bars may be made to generate the color sync by making its filter more or less transparent than the others, and compensating afterwards to correct the balance. The overall resolution of the output may be such as to blend the colors in the interval between color information and to diffuse the opaque sync mark so it is not noticeable.

The color sync may be produced in alternate ways; for example one sync signal may be generated per line relying on good linearity to give registration, with registration and size adjustment, or a special grid on the Vidicon face may be provided registered with the three colors.

FIGS. 15 through 22 are in the nature of illustrations of circuit details for the various embodiments which details have heretofore been generally referred to.

FIGURE 15 illustrates an example of an electronic sequencing switch such as indicated diagrammatically in FIG. 4. In FIG. 15, wideband amplifier and equalizer component 70 has been indicated as including a first amplifier stage 450 and a second amplifier stage 451. By way of example, the amplifying stage 450 may supply an output which is inverted in comparison to the waveforms shown in FIG. 5, while the amplifier stage 451 may supply output waveforms of the same polarity as indicated in FIG. 5. In this case, the output of the sync separator component 76 will be a series of positive pulses having a spacing, for example, of .18 microsecond for the example where there are 300 opaque stripes such as indicated at 22 in FIG. 3. In the illustrated circuit, it is assumed that the first monostable circuit 460 is triggered on the trailing edge of each sync pulse from the sync separator 76, this being the negative going edge of each sync pulse where the pulses are of positive polarity. Further, it is assumed that the output of the first monostable 460 will be a positive pulse of duration corresponding to the time required for the beam to scan the red stripe such as 23 following the opaque stripe giving rise to the synchronizing pulse. It is further assumed that AND gates 461–463 are enabled during the time when the corresponding monostable circuits 460, 465 and 466 are in their unstable condition. Thus, each of the gates 461–463 is normally held in a non-transmitting condition by the associated monostable 460, 465, 466. During the red sampling interval, however, the first monostable 460 will be in its unstable condition to place gate 461 in a transmitting condition so that the red signal from the target is supplied to conductor 81.

As the monostable 460 returns to its stable condition, it is assumed that the negative going signal at its output will trigger the second monostable 465 to its unstable condition enabling gate 462 during the green sampling interval. The time constants of each of the monostable circuits may be such that each of the gates 461–463 is enabled in sequence and each gate is held in the enabled condition for approximately .18 microsecond. The negative going edge of the output pulse from the second monostable 465 triggers the third monostable 466 placing gate 463 in a transmitting condition for the duration of the blue color sampling interval.

FIG. 16 indicates diagrammatically a typical sync separator circuit 76 for utilizing the sync signals from the camera tube. Since the color sync pulses may be occurring at a frequency corresponding to a sync interval of .18 microsecond rather than to the usual horizontal sync interval of approximately 63.5 microseconds, the time constants of FIG. 16 are adjusted appropriately. For example, when we utilize only the color sync pulses, R*g*C may be in the order of 1 to 10 microseconds, with R1, C1 and R2, C2 omitted. If we are interested also in the pulses corresponding to horizontal and vertical blanking intervals, then the circuit including C1, R1 and C2, R2 is useful for the purpose of decreasing the charging of capacitor C by the vertical and horizontal pulses. Here the network R1, C1 may have typical values so as to limit the charging of C during the vertical retrace interval of the camera tube scanning beam, while the network C2, R2 may have values selected so as to limit the charging during the horizontal retrace interval of the camera tube scanning beam while transmitting the color synchronizing pulses which are produced as the scanning beam traverses the successive opaque stripes or segments such as indicated at 22 in FIG. 3. Of course, the horizontal and vertical retrace pulses may be blocked from reaching the sync separator 76 by placing an AND gate in conductor 462 and connecting a second input of the AND gate, or second and third inputs of the gate to the horizontal and vertical blanking pulses which are supplied to the camera tube. In this way, only the color sampling sync pulses corresponding to the pulses 55 in FIG. 5 would reach the input of the sync separator 76, and the networks R1, C1 and R2, C2 in FIG. 16 could be omitted.

Figures 17, 18, 19:
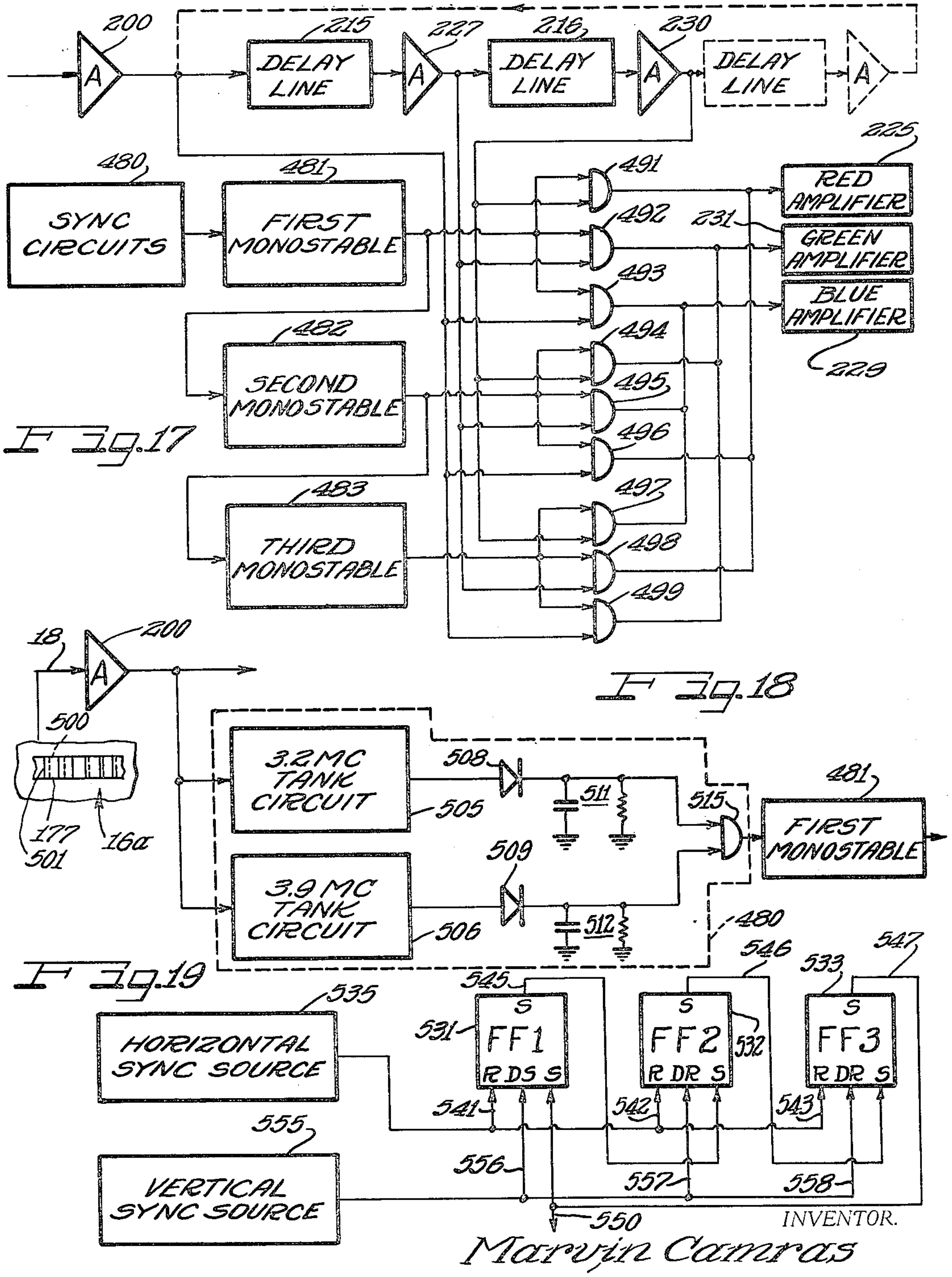
FIGS. 17, 18 and 19 are circuit diagrams indicating exemplary details for the system of FIG. 8.

FIG. 17 is an example of a detailed circuit for the electronic switch diagrammatically indicated at 211–213 in FIG. 8. In FIG. 17, the amplifier 200 may correspond to the amplifier and equalizer component 200 of FIG. 8, and the sync circuits component 480 may represent any suitable source of pulses such as the sync separator component 202 of FIG. 8. In the specific example illustrated in FIG. 17, it may be assumed that the output of component 480 is a pulse having a negative going trailing edge coinciding with the completion of scanning of a blue line such as indicated at 177. Such a signal could be produced by the use of a sync separator circuit comparable to the circuit utilized for separating vertical synchronizing pulses from horizontal synchronizing pulses in a television receiver. This type of circuit is explained in the book "Television" by Zworykin and Morton, second edition, 1954. This book illustrates in FIG. 14.47 at page 594 a multi-mesh integrating network whose time constants could be adjusted to respond to the pulse 184 of FIG. 9 in comparison to the normal horizontal retrace pulses such as indicated at 172. The regular horizontal retrace produced pulses such as 172 could be blocked by an AND gate, as could the vertical retrace pulses in the manner previously described. Where the pulses such as 172 are so blocked from the circuits component 480, the separated pulse such as indicated at 184, when inverted, would provide a negative going trailing edge at the beginning of the horizontal retrace interval. With this type of triggering of a first monostable 481, the first monostable could have a time constant such as to remain in its unstable condition for a time interval corresponding to the horizontal retrace interval plus the time required to scan the next following red line. This time interval might be, for example, 63.5 microseconds. Monostables 482 and 483 would then be in their respective unstable conditions from the end of the scanning of the red line to the end of scanning of the green line, and from the end of scanning of the green line to the end of scanning of the blue line, respectively. The first monostable 481 in its unstable condition is arranged to place AND gates 491–493 in their transmitting condition, the unstable condition of the second monostable 482 enabling AND gates 494–496, and the unstable condition of the third monostable 483 enabling AND gates 497–499. It will be apparent that the interconnections between the second inputs of the gates 491–493 and the outputs of amplifiers 200, 227 and 230 may be such that each of the red lines is supplied to red amplifier 225, each of the green lines is supplied to green amplifier 231 and each of the blue lines is supplied to blue amplifier 229.

It may be noted that the regions 182 of segments 177 on the target of FIG. 8 may comprise a series of relatively fine dark stripes so that the sync circuits component 480 would receive a series of negative pulses toward the end of scanning of each blue line, which pulses could be integrated in the sync circuits component 480, the integrated waveform being inverted to provide the negative going trailing edge for actuating the first monostable circuit 481.

FIG. 18 shows an example of an embodiment of the sync circuits component 480 of FIG. 18 wherein each blue segment 177 of the target 16*a* is provided with a first series of dark lines indicated by the solid lines 501 in FIG. 18 and is provided with a second set of dark lines such as indicated by the dash lines 502 in FIG. 18. The lines 501 and 502 would be produced by providing corresponding opaque stripes in the blue transmitting sections of the color mask associated with the target 16*a*. By way of example, the lines 501 might be spaced along the segment 177 so that scanning thereof would produce pulses at a rate of 3.2 megacycles per second, while scanning of the marks 502 would produce a pulse signal at a frequency of 3.9 megacycles per second. The output of the amplifier and equalizer component 200 is shown connected to tank circuits 505 and 506, the circuit 505 being resonant at the frequency generated by marks 501 such as 3.2 megacycles per second, and the circuit 506 being resonant at the frequency generated by the marks 502 such as 3.9 megacycles per second. Thus, when a blue segment such as 177 is being scanned, there will be an oscillatory output from circuits 505 and 506, which may be rectified by diodes 508 and 509 and integrated by means of integrating networks such as indicated at 511 and 512. Accordingly, during the scanning of the blue segments such as 177, there will be a relatively high output from each of the integrating networks 511 and 512 producing a high output from AND gate component 515. At the end of scanning of each blue segment 177, the output of gate 515 will comprise a negative going edge for triggering first monostable 481 so as to initiate operation of the circuit of FIG. 17 in the manner previously described. Since the tank circuits 505 and 506 would be insensitive to pulses generated during horizontal and vertical retrace intervals, there would be no necessity for including means for blocking these pulses in the circuit of FIG. 18.

FIG. 19 illustrates another circuit for use as component 480 of FIG. 17. This is a counting circuit which gives one pulse at the output 547 for every three pulses at the input 541. In this embodiment, three flip-flop circuits 531, 532 and 533 are interconnected to operate as a shift register operated from a horizontal sync source 535. By way of example, the horizontal sync source 535 may comprise the source of horizontal sync pulses within component 84 of FIG. 4. The aforementioned book by Zworykin illustrates the formation of the complete synchronizing signal and shows the production of horizontal driving pulses as waveform *p* of FIG. 14.48 pp. 596–597. It may be assumed that the source 535 supplies such positive horizontal driving pulses, and that the flip-flops 531–533 have reset inputs connected to conductors 541–543 which are responsive to the positive going leading edges of such horizontal driving pulses to reset any flip-flop which is in a set condition. Thus, assuming that the first flip-flop 531 is initially set and the other two flip-flops initially reset, a first horizontal driving pulse from source 535 would set the first flip-flop, and the output line 545 connected to a set output of flip-flop 531 would transmit a negative going pulse to the set input of flip-flop 532, setting flip-flop 532. Similarly the next horizontal driving pulse from source 535 would rest flip-flop 532, and the resetting of flip-flop 532 would provide a negative going pulse on output line 546 to set flip-flop 533. A third horizontal driving pulse from source 535 would reset flip-flop 533 producing a negative going pulse at output conductor 547 which leads to the set input of flip-flop 531, so that flip-flop 531 would become set to place the ring of flip-flops in its initial condition ready for another cycle. If the positive going leading edge of a horizontal driving pulse coincides with the beginning of the scanning of a red segment of the target 16*a*, and if this leading edge serves to reset flip-flop 533, for example, then the negative going output at conductor 547 may be connected to the first monostable 481 via a conductor 550 of FIG. 18 to initiate the sequencing of the monostables 481–483. Where the scanning is not interlaced, but simply proceeds along scanning lines 1, 2, 3, 4 . . . 525 from the top to the bottom of the target, it will be observed that scanning line 1 of each frame would be supplied to the red amplifier 225 and that each succeeding line would be supplied to a respective amplifier in sequence in each frame providing scanning were begun with a red line segment of the target and providing that flip-flop 533 were reset at the beginning of scanning of such red line segment.

With interlaced scanning if scanning line 1 registers with a red segment of the target, scanning line 3 registers with a green segment of the target and scanning line 5 registers with a blue segment of the target and so forth, scanning line 525 at the bottom of the target will coincide with a green segment of the target, and scanning line 2 of the next field would occur at a time when the blue amplifier 229 was conditioned to receive the signal from the target. To conform to this scanning sequence, the color mask of FIG. 8 would have a red stripe at the top of width to register only with scanning line 1, and this would be followed with a blue stripe of width to register with the first scanning line of the next field (scanning line No. 2). The third stripe on the color mask would be green to register with scanning line 3, and the next stripe would be red to conform with scanning line 4, and so on.

Preferably, however, the counting circuit is reset at each vertical blanking interval so that the stripes of the color mask may conveniently each have a width corresponding to two scanning lines as previously described with reference to FIG. 8, where interlaced scanning is used. With the provision for resetting if an error occurs, the error will not persist beyond the time of one field.

In the embodiment illustrated in FIG. 19, in order to definitely synchronize the flip-flops 531–533 with the scanning process, a vertical sync source 555 is provided connected with conductors 556–558 leading to a direct current set input of flip-flop 531, and direct current reset inputs of flip-flops 532 and 533, respectively. These direct current inputs to the flip-flops may be such as to override any synchronizing inputs from source 535 during the occurrence of each vertical sync pulse. In this way, with non-interlaced scanning, the flip-flops will be placed in a predetermined condition each time a complete frame has been scanned. For interlaced scanning, there will be two vertical sync pulses for each complete frame, and the flip-flops will be placed in a predetermined condition prior to the scanning of each field. As indicated in FIG. 14.46 at page 592 of the book by Zworykin, there may be six equalizing pulses following the vertical sync pulse interval during scanning of each field with interlaced scanning, so that whether the source 535 delivers horizontal sync pulses including equalizing pulses or merely delivers horizontal driving pulses, the circuitry may be such that the first line of each field will be connected to the same amplifier such as the red amplifier, the second line of each field will be connected to a second amplifier such as the green amplifier, and the third line of each field will be connected to the third amplifier such as the blue amplifier. The line widths of each color on the color mask are such as to register with both interlaced scans of the picture tube corresponding to that color.

Figures 20, 21, 22:
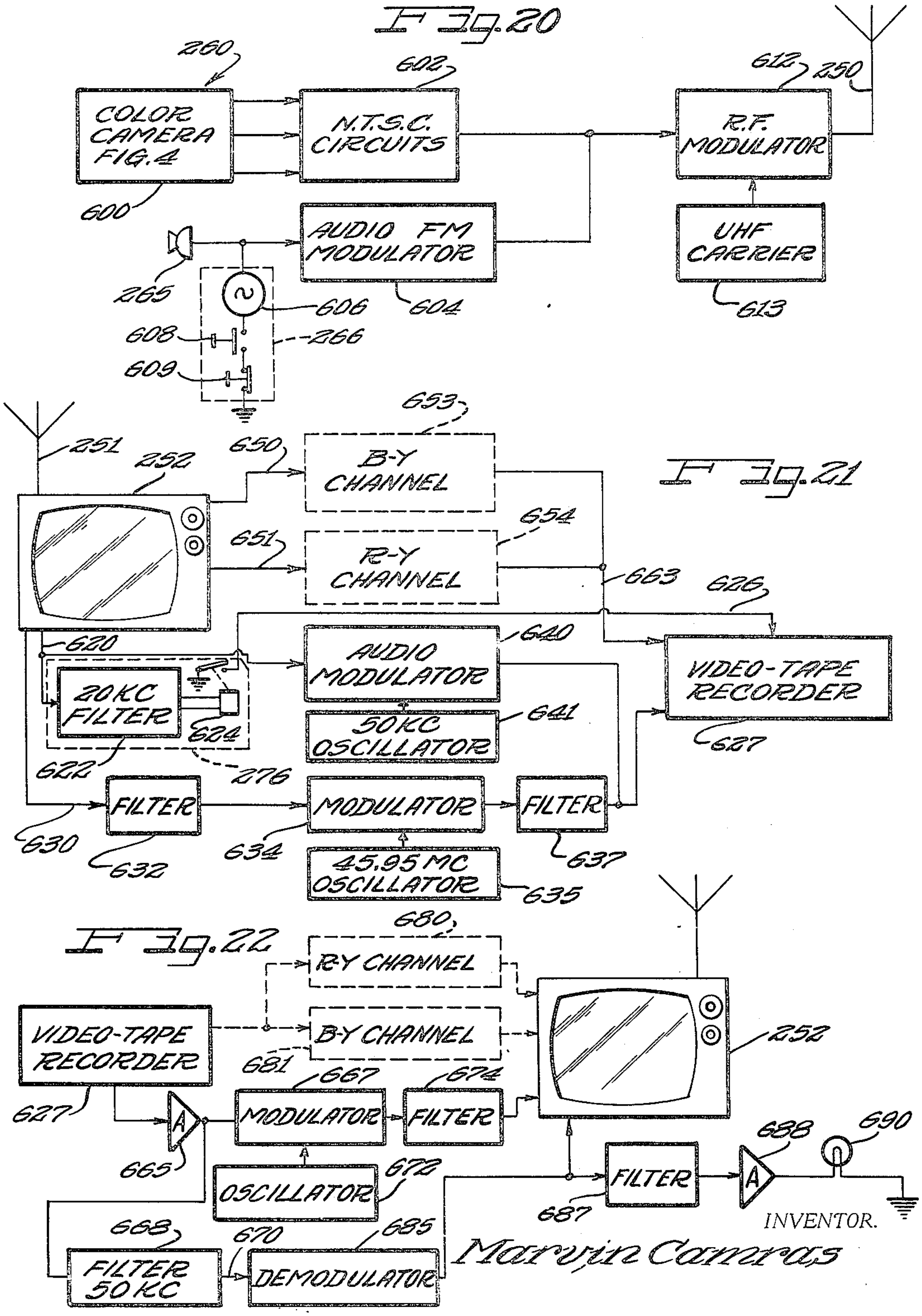
FIG. 20 is a diagrammatic view giving an example of camera circuitry in accordance with the embodiment of FIG. 10.
FIG. 21 is a diagrammatic view giving an example of receiver circuitry in accordance with the embodiment of FIG. 10.
FIG. 22 is a circuit diagram illustrating a playback arrangement for reproducing signals from a record tape produced by the system of FIG. 21.

FIG. 20 illustrates certin details relative to the embodiment of FIG. 10. Specifically, FIG. 20 illustrates a color camera 600 which employs the structure of FIGS. 1–3 and the electric circuitry of FIG. 4.

The color camera circuitry 600 may supply color component signals such as the red, green and blue signals from amplifiers 72–74 of FIG. 4 or the —Y, $R-Y$ and $G-Y$ signals from components 86–88 of FIG. 4. These signals are supplied to conventional means 602 for composing a broadcast color television signal for example in accordance with current United States broadcast standards. The audio signal from microphone 265 together with any control signal from component 266 would be supplied to an audio circuit such as indicated at 604 which could comprise the standard circuits for generating a 4.5 megacycle per second audio signal in conventional color television broadcasting. By way of example, control circuit 266 is illustrated as comprising a source 606 of a suitable frequency such as 20,000 cycles per second or other frequency within the bandpass of the sound channel for transmission by the component 604 along with the audio signal from microphone 265. By way of example, it may be assumed that the presence of the control signal from source 606 might start a suitable color television tape recorder circuit such as indicated in FIG. 21 which tape recorder would continue to operate until the control signal from source 606 was no longer present. Thus push button 608 in FIG. 20 could represent a start button for initiating operation of a remote tape recorder, for example the button 608 being latched in its closed position until a stop button 609 is depressed. Depressing of the stop button 609 momentarily may serve to unlatch the start button 608 returning it to the position shown in FIG. 20, the stop button 609 being spring urged to its closed condition so as to return to the closed condition after manual actuation to stop operation of the remote tape recorder. Components 612 and 613 may represent conventional circuitry for transmitting a color television broadcast signal on a suitable frequency such as an ultra high frequency. The radiated power may, of course, be just sufficient to carry the signal to the desired receiving station such as indicated at 252 in FIGS. 10 and 21. Alternatively, the carrier frequency source 613 may operate at a frequency corresponding to one of the very high frequency television channels which is not being utilized in the vicinity of the camera circuitry 260.

FIG. 21 is also related to FIG. 10 and illustrates a specific receiver arrangement for the camera 260 including the television receiver 252. In the illustrated embodiment, the control signal generated by source 606 in FIG. 20 is shown as being removed by means of a conductor 620 which could be connected to the sound demodulator circuit of the television receiver 252. The demodulator sound and control signal is shown as being supplied by conductor 620 to a filter 622 designed to block the sound signal while transmitting the control frequency to a relay 624. Thus so long as the control button 608 of FIG. 20 is depressed, relay 624 will be held energized and ground will be applied to a conductor 626 leading to a video tape recorder component 627. By way of example applying ground to conductor 626 may cause the actuation of a relay associated with component 627 which places the video tape recorder 627 into operation. Suitable video tape transports are illustrated in my copending applications Ser. No. 401,832 filed Oct. 6, 1964, Ser. No. 456,192 filed May 17, 1965 and Ser. No. 493,271 filed Oct. 5, 1965. A preferred color television recording system is disclosed in my copending application Ser. No. 528,934 filed Feb. 21, 1966, for example.

As an alternative to the system described in said previous application Ser. 528,934 and as an alternative to the system illustrated in FIG. 13 of the present application, for example, in FIG. 21, a conductor 630 is illustrated which may be coupled to pin 7 of the third picture IF tube V303 of the RCA chassis Model CTC16. Here the intermediate frequency is 45.75 megacycles per second for the picture carrier. This IF signal may be supplied to a filter 632 having a cut-off in its transmission characteristics above about 45.85 megacycles per second so that a bandwidth is transmitted extending up to approximately 45.85 megacycles per second. The filtered intermediate frequency signal is then supplied to a modulator component 634 having a local oscillator 635 operating at a frequency of 45.95 megacycles per second, for example so as to generate a carrier frequency of .2 megacycle per second and lower sideband frequencies down to about .1 megacycle per second. The filter 637 may transmit frequencies up to 2.2 megacycles per second or higher, for example up to 3 megacycles per second. The filter 637 may not be necessary since the tape recorder 627 may not respond substantially to the higher frequencies. In any event, either the filter 637 or the bandwidth of the tape recording circuit 627 would serve to remove the color sub-carrier and audio components of the signal supplied to conductor 630.

Since the frequency spectrum below about .1 megacycle per second is vacant for the picture signal supplied by 637, an audio signal may be obtained from conductor 620 and supplied to an audio modulator component 640 having a local oscillator 641 operating at a frequency such as 50 kilocycles per second, with the output of the modulator 640 being recorded on the same channel with the output of the modulator component 634.

The information carried by the color sub-carrier may be supplied to the tape recorder 627 for recording on one or more additional channels of the magnetic tape in the manner described in my copending applications such as Ser. No. 528,934 filed Feb. 21, 1966. As a further example illustrated in FIG. 21, conductor 650 may receive the demodulated $B-Y$ signal, for example from pin 6 of tube V706B of the chassis Model CTC16 previously referred to, and a conductor 651 may connect to pin 6 of tube V706A of said chassis. These signals may be displaced in frequency by circuitry such as illustrated in FIG. 11 so that the output of component 653 has bandwidth between 0.2 megacycle per second and .8 megacycle per second and the output of component 654 has a bandwidth between 1.2 megacycles per second and 1.8 megacycles per second. These two output signals may then be suitably combined for recording on a single channel of the magnetic tape by means of the recorder 627 as diagrammatically indicated in FIG. 21.

The components 303 and 307 of FIG. 11 may comprise frequency modulator components instead of amplitude modeulator components, with the same results as described with reference to FIG. 11 previously. To give an example, if video signal source 300 in FIG. 11 corresponds to the conductor 651 in FIG. 21 and has an initial bandwidth extending from approximately 0 to 0.5 megacycle per second, then a frequency modulated signal may be generated at the output of filter 305 extending from approximately 9.5 megacycles per second to approximately 10 megacycles per second. This may be assumed to represent a frequency modulated signal, Then, if the local oscillator 308 is operating at a frequency of 11.2 megacycles per second, the carrier at the output of the modulator 307 will be at a frequency of about 1.2 megacycles per second with a bandwidth extending to approximately 1.7 megacycles per second, for example. As previously the following components such as 309, 311 or 313, 315 would transmit frequencies up to an upper frequency limit such as 1.7 megacycles per second. Thus, in this example also, the bandwidth of the $R-Y$ signal has been shifted to a carrier frequency within its original bandwidth, the carrier being located at the low frequency end of the recorded bandwidth. The $B-Y$ channel may supply a $B-Y$ signal having a bandwidth of the order from 0 to 500 kilocycles per second, but displaced so as to occupy a band from approximately 200 kilocycles per second to approximately 700 kilocycles per second in the manner illustrated in FIG. 11. The modulator components 303 and 307 may produce frequency modulated signals, for example, and the oscillators may operate at 10 megacycles per second and 10.2 megacycles per second as previously described in connection with FIG. 11. Thus, the signals applied to the video tape recorder 627 by means of conductor 663 may occupy an overall frequency band from about 100 kilocycles per second to about 1.7 megacycles per second, thus avoiding the recording of relatively low frequencies with consequent reduced cross talk. The carrier signals at .2 and 1.2 megacycles per second are relatively immune from dropouts and noise.

The video tape recorder 627 may take any of the forms described in my copending application Ser. No. 528,934 filed Feb. 21, 1966.

Refering to FIG. 22, playback of the signal recorded by the system of FIG. 21 is illustrated. Playback amplifier component 665 may be conformed with the circuitry given in my copending application Ser. No. 528,934 and may supply its output to a modulator component 667 and to a filter 668 having a band pass in the region of 50 kilocycles per second, for example to transmit the audio portion of the signal. The output at 670 from filter 668 would connect, for example, to a suitable demodulator circuit, and the output of the demodulator circuit would be coupled to the audio circuits of the television receiver 252. For example, the audio signal could be supplied to pin 1 of V106 audio output stage, or (if more gain is required) to pin 1 of tube V202 of the RCA chassis CTC16.

The modulator component 667 could be supplied by a local oscillator 672 operating at a frequency of 45.95 megacycles per second so as to reconstruct the intermediate frequency signal having a carrier at 45.75 megacycles per second. Filter 674 would be designed to transmit the Y signal information and thus might transmit frequencies in the range from 43 megacycles per second to 45.85 megacycles per second, for example. The output of filter 674 would then be connected to the IF circuits of the TV receiver at a suitable signal level depending on the gain required.

By way of example, the tape recorder 627 is illustrated as supplying reproduced signals to $R-Y$ channel 680 and a $B-Y$ channel 681 so as to supply $R-Y$ and $B-Y$ signals to the receiver 252. By way of example, having reference to the recording mode described in connection with FIG. 21, the $R-Y$ channel 680 may include filter means for rejecting signal frequencies below about 1 megacycle while the $B-Y$ channel 681 may reject frequencies above about .8 megacycle per second, for example. The $R-Y$ channel would include a playback circuit such as indicated in FIG. 12 but with a local oscillator operating at 11.2 megacycles per second, for example, the filter transmitting frequencies in the range from about 9.5 megacycles per second to about 10 megacycles per second. The converter component of FIG. 12 would then include a suitable limiter and discriminator circuit followed by an amplitude modulation detector so as to reconstruct the original $R-Y$ signal. The $R-Y$ reproduced signal could then be handled by the circuitry disclosed in connection with parts *a* and *b* of the fourth figure of my copending application Ser. No. 528,934. For example the signal could be applied to the lead marked X in this FIG. 4A with ground as return.

Similarly in the $B-Y$ channel, a 10.2 megacycles per second local oscillator could then be employed together with a suitable filter for transmitting frequencies in the range between 9.5 megacycles per second and 10 megacycles per second, approximately, with the converter then including suitable limiter, discriminator and amplitude modulation detector circuitry for producing the original $B-Y$ bandwidth which could then be handled in accordance with the handling of the Z signal as disclosed in part *a* and *b* of the fourth figure of my copending application Ser. No. 528,934 filed Feb. 21, 1966. For example the signal could be applied to the lead marked Z, and to the ground as return.

For the purposes of diagrammatic illustration, an audio demodulator component is indicated at 685 supplying the original audio signal to the television receiver 252 and coupling to a filter 687 having a bandwidth to transmit the 20 kilocycle per second control signal. The output of the filter 687 may be suitably amplified by means of an amplifier component 688 and then may drive any suitable indicator means such as a lamp 690. The lamp 690 is then extinguished momentarily at times corresponding to the times when stop button 609 of FIG. 20 had been depressed during the recording operation. Thus, when the stop button 609 is depressed, the 20 kilocycles per second control signal will be interrupted, but the tape will continue its movement at the tape recorder 627, FIG. 21, until such time as relay 624 is deenergized, and the tape recorder brought to a stop. Preferably, the relay 624 would also eliminate any high frequency bias from the video head during a stop operation, and would otherwise interrupt the recording circuits, so that the 20 kilocycles per second control signal would be absent from the tape approximately for an interval corresponding to the delay in operation of relay 624. This indication of when the recording operation was interrupted might be of benefit in certain specialized applications. If desired, of course, a relay could be substituted for the lamp 690, and could be so arranged as to become unlatched each time the control signal is interrupted so as to stop the tape recorder, until such time as a re-start button is manually operated to start operation of the tape recorder again. The re-start button for restarting playback operation would be manually depressed and held to restart the playback operation after each unlatching of such relay. The amplifier 688 would invert the signal from filter 687 so that the unlatching current would return to zero when the playback operation was restarted and the recorded control signal was again being received by the amplifier. After this, the re-start button could be released and playback would continue until the next recorded stop interval.

Referring to the embodiment of FIG. 13, the detuning of the tank circuits during recording leads to amplitude modulation as well as frequency modulation being recorded on the magnetic record tape of component 375. This has been found beneficial in some cases.

The sound circuit of FIG. 13 may be modified to generate its own oscillations in case the 3.58 megacycles per second source is not available (as in monochrome TV sets) or in case a different frequency is desirable. This may be done by inserting a few turns at L4 in the collector circuit of T1 and coupling them to coil L2, with proper feedback polarity to produce oscillations tuned by L2 and C5 to a desired frequency such as near 3.7 megacycles per second. Switch S5 is opened for this mode of operation, and lead 372 is not used.

With respect to the embodiment of FIG. 19, it would be more economical to control gates 491–499 of FIG. 17 from respective stages 531–533 since only one such stage has a "high" set output at each color sampling interval. Thus where flip-flop 532 is set during red scanning intervals, the conductor 546 would be connected to the top inputs of gates 491–493 instead of monostable 481, and conductor 547 would control gates 494–496 and conductor 545 would control gates 497–499.

Alternatively an oscillator could drive monostables 481–483 or flips-flops 531–533 and be locked to a color sync signal from component 480 in FIG. 17.

Referring to FIGS. 21 and 22, separate channels of the magnetic record tape of component 627 may be used for each color component such as $B-Y$ as supplied by conductor 650 and $R-Y$ as supplied by conductor 651. The recorded signal for each channel would then be displaced by 200 kilocycles per second (kilohertz), for example, as compared to the demodulated input color information from 650 and 651 by means of the circuitry of FIG. 11 (using either amplitude or frequency modulation).

It will be understood that while specific frequencies, etc. have been used in various examples for clarity, others may be chosen that utilize the illustrated principles advantageously.

It will be apparent that many modifications and variations may be effected without departing from the scope of the novel concepts of the present invention.

I claim as my invention:

1. The method of generating color television signals which comprises transmitting respective color components of a scene to be televised onto respective segments of a target, scanning the segments of the target to generate an electric signal in response to the light intensity illuminating each segment, and deriving from the target respective color signals each representing the response of the segments illuminated by one of said color components, said method being characterized by transmitting one of the color components with uniformly greater intensity than the other components so as to generate a distinctive synchronizing signal for use in switching the color signals to the respective color channels.

2. Apparatus for generating color television signals comprising a television camera device having a target with photosensitive means electrically responsive to light impinging thereon, a light path along which light travels to impinge on the target, and a single scanning means for scanning said target to generate an electric signal in accordance with the intensity of light focused on said target, and color mask means interposed in the light path leading to said target for transmitting different color components of a scene to be televised to different segments of the target, said apparatus further comprising said color mask means having means utilizing segments of the target having a lesser extent than other segments to generate synchronizing signals for utilization to separate respective color signals from the device in accordance with the different color components.

3. Apparatus for generating color television signals comprising a television camera device having a target with photosensitive means electrically responsive to light impinging thereon, a light path along which light travels to impinge on the target, and a single scanning means for scanning said target to generate an electric signal in accordance with the intensity of light focused on said target, and color mask means interposed in the light path leading to said target for transmitting different color components of a scene to be televised to different segments of the target, wherein the improvement comprises, said color mask means having a plurality of sets of color stripes for transmitting the respective color components to respective sets of segments of the target, and said color mask means having a set of opaque stripes interposed among the sets of color stripes, said opaque stripes being substantially narrower than said color stripes and serving to generate a synchronizing signal in response to scanning of associated relatively narrow segments of the target.

4. Apparatus for generating color television signals comprising a television camera device having a target with photosensitive means electrically responsive to light impinging thereon, a light path along which light travels to impinge on the target, and a single scanning means for scanning said target to generate an electric signal in accordance with the intensity of light focused on said target, and color mask means interposed in the light path leading to said target for transmitting different color components of a scene to be televised to different segments of the target, wherein the improvement comprises, said color mask means having color filter elements for transmitting the respective color components, and the color filter elements for transmitting one of the color components having a substantially different degree of transparency so as to provide for the generation of synchronizing signals.

5. Apparatus for generating color television signals comprising a television camera device having a target with photosensitive means electrically responsive to light impinging thereon, a light path along which light travels to impinge on the target, and a single scanning means for scanning said target to generate an electric signal in accordance with the intensity of light focused on said target, and color mask means interposed in the light path leading to said target for transmitting different color components of a scene to be televised to different segments of the target, wherein the improvement comprises, said color mask means having a biasing light source transmitting one of said color components, and said color mask means for transmitting the different color components consisting essentially only of light transmitting stripes and being essentially free of opaque regions in the path of biasing light from said biasing light source, the stripes which transmit said one of said color components providing a stronger output from the associated segments of the target for producing synchronizing in the absence of any opaque regions.

References Cited

UNITED STATES PATENTS

| | | |
|---|---|---|
| 2,296,908 | 9/1942 | Crosby. |
| 2,820,167 | 1/1958 | Schroeder. |
| 2,899,489 | 8/1959 | Cheetham et al. |
| 2,917,574 | 12/1959 | Toulon. |
| 2,922,837 | 1/1960 | Boothroyd et al. |
| 3,087,985 | 4/1963 | Heijne et al. |

RICHARD MURRAY, Primary Examiner